Oct. 19, 1971          E. RIGGS          3,613,339
HARVESTERS FOR PEPPERS AND OTHER CROPS
Filed June 23, 1969          2 Sheets-Sheet 1
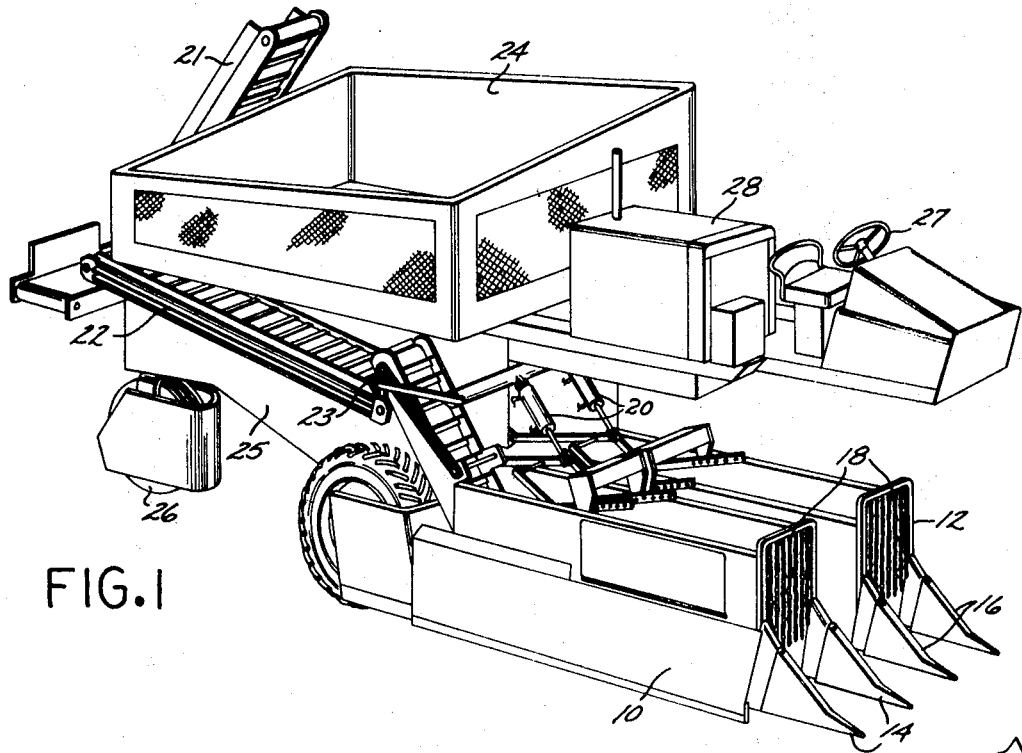
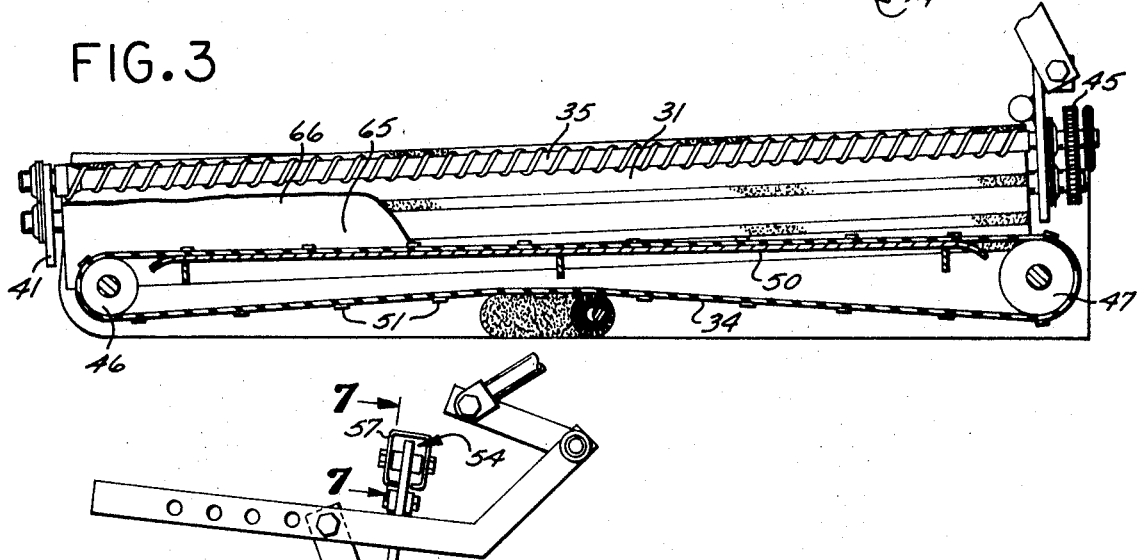
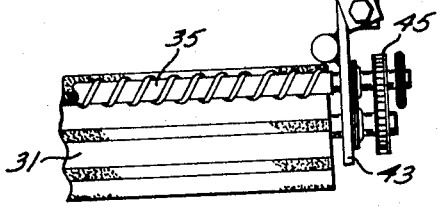
INVENTOR.
ERNEST RIGGS
BY
Nienow & Frater
ATTORNEYS

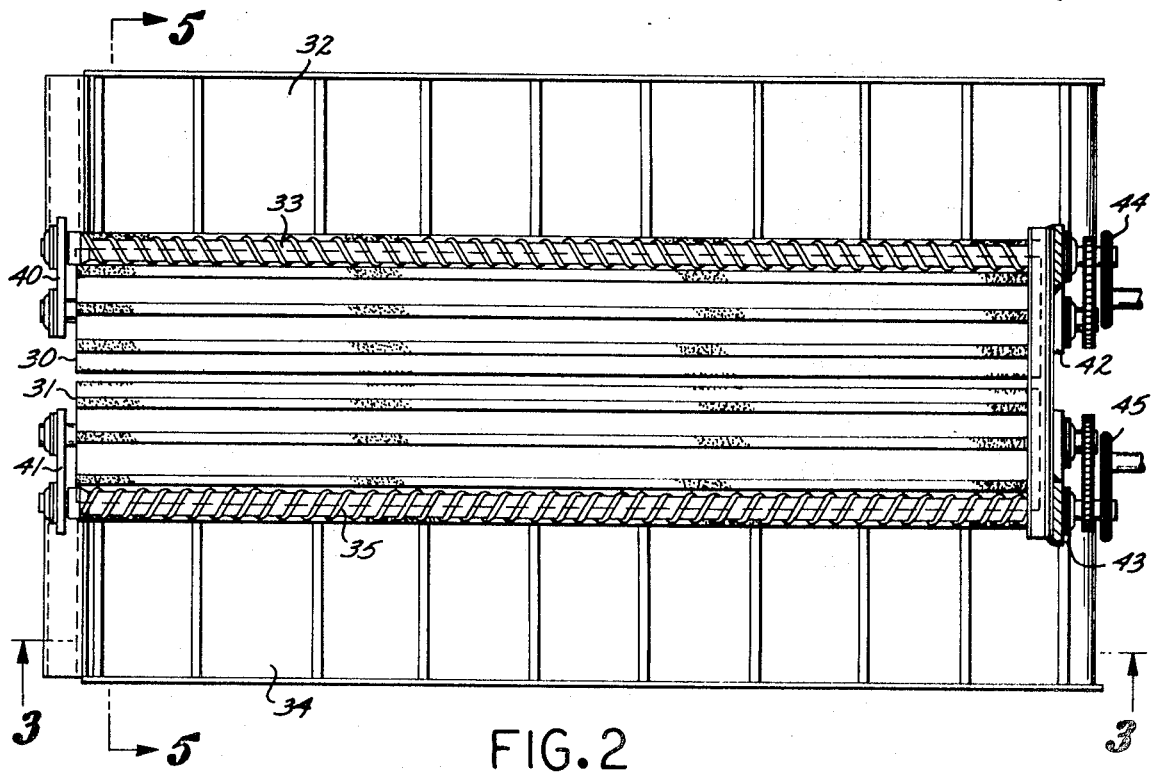
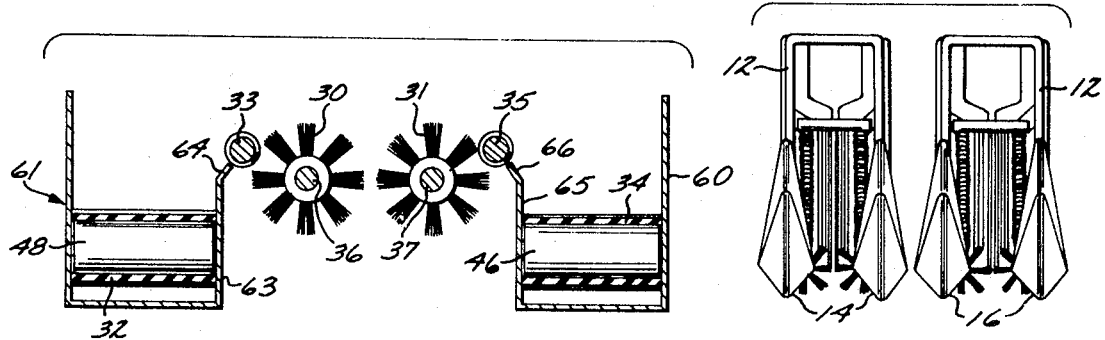
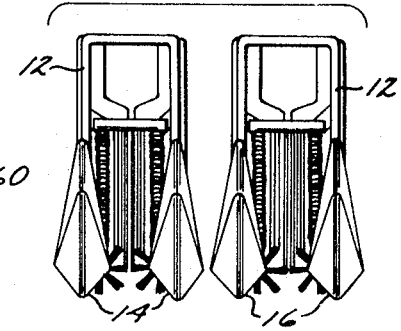
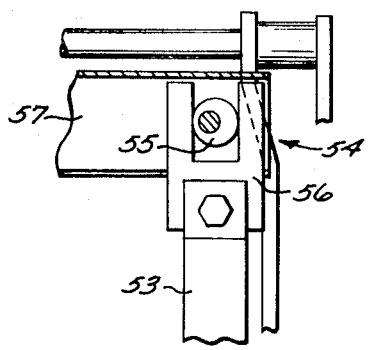

United States Patent Office 3,613,339
Patented Oct. 19, 1971

3,613,339
HARVESTERS FOR PEPPERS AND OTHER CROPS
Ernest Riggs, Las Cruces, N. Mex., assignor to New Mexico Chili Company, Las Cruces, N. Mex.
Filed June 23, 1969, Ser. No. 835,417
Int. Cl. A01d 45/22
U.S. Cl. 56—130                                    13 Claims

ABSTRACT OF THE DISCLOSURE

This invention relates to improvements in crop harvesters for row crops including chili peppers. The embodiment selected for illustration is a chili pepper harvester in which the harvesting mechanism comprises a pair of oppositely rotating, elongate brushes arranged in parallel so that they can be moved forward relative to a row crop between them. Associated with each of the brushes, at the side away from the other brush, is a belt conveyor to carry away crop brushed from the crop plant. An elongate, rotating stripper bar is arranged in the path of movement of material from the brushes to the conveyor in position to be brushed by the bristles of the rotating brush. The stripper bar cooperates with a blade which extends along its length closely adjacent to its surface to shear and chop crop plant torn off by the brushes and cleaned from the brushes by the stripper bar. The machine incorporates provisions for elevating, including, and altering the separation between the brushes and their associated conveyors and stripper bars.

---

This invention relates to improvements in harvesters and it relates particularly to harvesters of row crops such, for example, as chili peppers.

One object of the invention is to provide an improved harvester of the class in which a crop is stripped or brushed from the plant as the harvester is moved along a row of plants. Another object is to provide an improved harvester for crops growing close to the ground. A related object is to provide an improved harvester for crops which may occur at any point over their height beginning at a point close to the ground.

The chili pepper is one such plant and while the invention is not limited to the harvesting of chili peppers, it is very advantageously used in this application and one of the objects of the invention is to provide a practical and efficient chili pepper harvester.

One of the problems presented by a crop which grows close to the ground is that it is difficult to employ a conveyor to carry away the crop after harvesting using gravity to transport the crop from the harvesting apparatus to the conveyor. It is an object of the invention to provide a structure in which the low growing crop, such as chili peppers, may be stripped or brushed from its plant and transported away from the brush or stripper by a conveyor without need to uproot the plant and while proceeding along a row of plants.

Another object is to provide a harvester which can be adapted to a wide variety of field and crop conditions. In this connection, under certain field conditions less force is required to pull the crop plant from the soil than to separate some of the crop from the plant. An object of the invention is to provide a harvester whose harvesting mechanism will not be fouled by crop plant or vine.

In the case of the chili pepper, the crop adjacent to the ground matures first and it is desirable sometimes to harvest the lower pods prior to harvesting the upper pods. Another object of the invention is to produce a harvester by which that may be done.

Other objects are to provide a harvester which can be produced at a sufficiently low cost in sufficiently reliable and rugged form to make its use feasible in fields of minimum size and without excessive row spacing.

These and other objects and advantages of the invention are realized in part by the provision in a crop harvester of a pair of roll brushes each formed about an elongate center axis and mounted substantially in parallel; by provision of a pair of elongate stripper bars mounted one adjacent to each of said brushes substantially parallel therewith and on the side outwardly of the brushes; by the provision of means for rotating said brushes in opposite directions upwardly over crop plants between them; and by the provision of means for conveying away crop brushed from the crop plants. Thus, the invention employs a first element for separating the crop or fruit from its plant, a second element for conveying the crop away and a third element which aids in transferring the crop from the first to the second of those elements and in preventing fouling of the first element.

The transfer element, which may have any of a number of forms, is termed a "stripper bar." The first element, which serves to separate the crop from its plant, comprises a structure which strips or brushes the crop from the plant. This structure may have several forms, some of which are called brushes and others of which are called strippers. To avoid confusion with "stripper bar," the term "brush" has been used to designate any of these forms as well as the specific form in which a brush is employed.

The embodiment selected for illustration in the drawings employs a stripper bar in the form of an auger and a brush in the form of a roll brush made with bristles projecting from a central support structure. The embodiment selected for illustration is particularly useful as a pepper picker, although it can be employed that this is not the only crops and it is to be understood that this is not the only embodiment of the invention that is useful in picking chili peppers.

In the drawings:

FIG. 1 is an isometric view of a harvesting machine embodying the invention;

FIG. 2 is a top plan view on an enlarged scale of that portion of the harvester which straddles a row of crop plants, picks, and transports the crop away;

FIG. 3 is a cross-sectional view of the harvesting apparatus taken on line 3—3 of FIG. 2;

FIG. 4 is a view in side elevation, partly schematic, of the mechanism by which the elevation, the angle of inclination and the separation between parts of the harvesting mechanism may be altered;

FIG. 5 is a cross-sectional view of the harvesting structure taken on line 5—5 of FIG. 2;

FIG. 6 is a view in front elevation of the two harvesting structures of the harvesting machine of FIG. 1, but with their crop plant control chain removed; and FIG. 7 is a cross-sectional view taken on line 7—7 of a portion of the harvesting mechanism supporting structure.

Referring to FIG. 1 of the drawing, the harvesting machine there shown comprises two harvesting mechanisms or structures arranged side by side to straddle adjacent rows of a row crop. One harvesting structure is housed in the enclosure 10 and the other is housed in the enclosure 12. Each of the harvesting mechanism enclosures includes a pair of guides at its forward end whose function is to direct all of the plants in the row they straddle to the harvesting mechanism inside the enclosure. The two guides of the enclosure 10 are designated by the reference numeral 14 and the two guides of the enclosure 12 are designated by the reference numeral 16. This embodiment includes a series of chains suspended so that they hang downwardly in the entrance opening of the harvester enclosures. These chains, which are designated 18 in FIG.

1, aid materially in restraining the upper portion of a tall plant until the lower portion of that plant is engaged by the harvesting mechanism. The hydraulic cylinders 20 form part of a mechanism, more clearly shown in FIGS. 4 and 7, by which the harvesting structures may be raised and lowered and adjusted in other dimensions. A crop harvested by the harvesting mechanism is conveyed by a series of conveyors including sections 21, 22 and 23, and other conveyors not visible in FIG. 1, and which form part of the harvesting machanisms, to a tiltable bin 24. The harvesting mechanisms, the conveyors and the bin 24 are transported over the field to be harvested by a three-wheeled vehicle 25 which is steered by its rear wheel 26 from a control station 27 located above and between the harvesting structure enclosures 10 and 12. The machine includes a motive means which in this instance is housed in the enclosure 28 behind the control station.

The size and the form of the structures employed in this embodiment make it particularly useful for harvesting chili peppers. Chili peppers grow on plants or vines, which stand three feet or more tall. The crop or pepper pod to be harvested is four to ten inches in length and from three-quarters to one and one-quarter inches in diameter. Most of the pepper pods will fall in that size range. However, some will be substantially smaller and the particular machine shown is effective to harvest a high percentage of those chili pods which are very much smaller than the usual size range in which virtually all pods are harvested. However, while the machine shown will harvest pods which differ in size by a ratio of ten to one or more, the machine is advantageously constructed in smaller size when intended for harvesting crops whose fruit or pods have smaller size.

The harvesting mechanism advantageously comprises two similar sets of elements which can be made to straddle a row of crop plants. It is not essential to successful practice of the invention but advantageously the two sets of elements are substantially alike except for being mirror images one of the other. At least one set, and advantageously both sets comprise three elements. One of these elements comprises a means for applying force to the crop, here the pepper, to pull it from its plant or vine. Advantageously that element is effective to propel the crop to another element of the harvesting structure by which it is conveyed away to be collected as harvested crop. The third element of the structure comprises a means for assisting in transferring the crop from the element that picked it to the element that conveys it away and also insures that portions of the crop plant that are torn away from the plant or from the ground during the harvesting process are not permitted to remain in the harvesting mechanism. The first of these elements may have various forms effective to push or brush the crop away from its plant and accordingly, is called a brush. It may advantageously, and in this embodiment does, have the form of a brush in that it is formed of a series of resilient bristles.

The means for conveying away the harvested crop may comprise a conveyor of any suitable form capable of conveying away the crop without damage. Advantageously, it comprises a belt conveyor as it does in this embodiment. The third element is here called a stripper bar. Advantageously it comprises an elongate rod mounted parallel with the brush and conveyor in the path of crop moving from the brush to the conveyor and is formed with radially outwardly extending projections by which it can apply force to the material being transported from the brush to the conveyor as the stripper bar is rotated. In this embodiment the stripper bars are formed as large pitched augers with a shallow blade.

In this embodiment the augers are formed by winding steel cable around an elongate cylindrical bar. The cables are wound in a direction relative to the direction of rotation of the bar such that material engaged by the cable or auger tends to move toward the rear of the harvesting mechanism.

The harvesting mechanism illustrated in FIG. 2 comprises two brushes 30 and 31, a conveyor 32, and auger 33 associated with the brush 30, and a conveyor 34 and an auger 35 associated with the brush 31. The brushes and augers are elongate structures. They are all rotatable about their respective central lengthwise axes, and they are mounted so that their axes lie substantially in parallel. The separation between the axis of each brush and the axis of its associated stripper bar or auger is fixed in this embodiment and the brush and auger have relative diameters such that the bristles of the brush touch the surface as the brush sweeps past its respectively associated auger. In this embodiment the brushes are formed with their bristles arranged in rows which extend over the length of the brush and so the rows are separated one from the other as best shown in FIG. 5. The brush is formed by eight rows of bristles mounted so that they extend radially outward from the center structure 36 of brush 30 and 37 of brush 31, with each row of bristles extending at substantially forty-five degrees from the adjacent rows. This construction insures a brushing action without piercing of the crop.

While it is not essential, the conveyor belts are arranged so that they move along in planes substantially parallel to the axis of rotation of the brushes and stripper bars. The forward ends of the brush 30 and stripper bar 33 are mounted in a forward bearing plate 40 and the front end of the brush 31 and the stripper bar 35 are mounted in a forward bearing plate 41. At the other end of the brushes and stripper bars, at the right in FIG. 2, brush 30 and bar 33 are mounted in a rear bearing plate 42 and brush 31 and bar 35 are mounted in a rear bearing plate 43. Means are provided in the invention for rotating the brushes 30 and 31 in opposite direction so that the bristles between their two axes are moving upward. These elements are seen from the front in FIG. 5 where brush 30 rotates counterclockwise and brush 31 rotates clockwise. The surface of stripper bars or augers 33 and 35 rotate opposite of the brush bristles that sweep them respectively. Thus, in FIG. 5, the stripper bar 33 rotates counterclockwise and the stripper bar 35 rotates clockwise. Advantageously, the projections, here the auger surface of the stripper bars have linear velocity greater than the outer ends of the bristles of the brushes in small degree. In addition, in preferred form the stripper bars have a smaller diameter than do the brushes. In this embodiment the stripper bars have diameter about one-fourth that of the brushes so that the stripper bars are made to rotate one-fourth or more as fast as the brushes. In this embodiment a ratio of rotational speed in that order between the stripper bar and its associated brush is assured by the gearing structure 44 associated with the brush 30 and stripper bar 33 and the gearing structure 45 associated with the brush 31 and the stripper bar 35.

The conveyors 32 and 34 comprise endless belts mounted for rotation over spaced parallel rollers. The forward roller 46 and the rear roller 47 of conveyor 34 may be seen in FIG. 3. The forward roller 46 of conveyor 34 and the forward roller 48 of conveyor 32 are visible in FIG. 5. In FIG. 3 the element 50 is a support platform for the upper section of the conveyor belt. Advantageously, the belt is provided with spaced cross members 51 affixed to its outer surface to aid in transporting the crop when the harvesting mechanism is inclined at a steep angle as it is shown to be in FIG. 6 which shows the mechanisms in front elevation with the entrance chains 18 omitted.

The supporting structure illustrated in FIG. 4 makes it possible to lift the whole of the harvesting structure relative to the wheels of the conveyance which carries it. This adjustment is provided to insure that the harvesting mechanism will be disposed at the proper height regardless of the degree of "hilling" of the crop rows. By a different manipulation of this same structure the rear bearing plate, and so the rear end of the harvesting structure, may be elevated in different degree above the front end to change the angle of inclination of the structure or the height above the ground at which crop will be harvested. In the case of certain crops, such for example as chili peppers, the crop ripens earliest close to the ground. Alteration of the inclination angle of the harvesting structure can make it effective to harvest only the lowermost peppers of the vine leaving the upper peppers for harvesting later.

Under certain field conditions the crop plant is pulled from the earth relatively easily. For this reason, and for the further reason that it is always desirable to remove as little of the vine as possible, the machine is operated so that it applies the minimum force necessary to remove the crop from the crop plant and to apply minimum force to the vines and leaves of the crop plant. Two adjustments are provided in this embodiment by which to insure such operation. First, means are provided by which to vary the rotational speeds of the brushes and stripper bars. In addition, means are provided for changing the spacing between the two brushes. Any convenient means may be employed to suspend the brushes and their stripper bars to enable change in brush separation. In this embodiment that means comprises support arms upon which the brush and its associated stripper bar and conveyor are mounted. The arms are suspended from the transporting structure by an eccentric mechanism by which the bar may be rotated slightly to carry its brush toward away from the other brush. One of these arms is visible in FIG. 4 where it is designated by the reference numeral 53. The eccentric mechanism by which it is mounted is generally designated by the reference numeral 54. The eccentric itself is best seen in FIG. 7 where it is designated by the reference numeral 55. The eccentric cooperates with a U-shaped member 56 which straddles the eccentric and is attached to the cross bar 57 carried by the transporting mechanism. The arm 53 is fixed to and extends downwardly from the U-shaped interconnection member 56.

The conveyor associated with each brush and stripper bar is located below the stripper bar and extends outwardly therefrom away from the brush. The structure is arranged with side walls extending upwardly at each side of the conveyor belt. This arrangement is best shown in FIG. 5. Side wall 60 is disposed at the outer side of the conveyor 34 and the side wall 61 is disposed at the outer side of conveyor 32. At the inner side of conveyor 32 a vertical wall 63 separates the conveyor and brush. The upper portion of this wall is formed inwardly toward the stripper bar 33 and a blade 64 is fixed to it so that the upper surface of the blade is disposed closely adjacent the surface of the stripper bar or auger 33. Similarly, the separating wall 65 between brush 31 and conveyor 34 terminates at its upper end in an inwardly projecting portion to which a blade 66 is fixed. This blade terminates closely adjacent the surface of stripper bar or auger 35. This is illustrated in FIG. 3 where part of the panel 65 and the blade 66 are shown, the remainder being broken away to make the brush 31 visible.

In operation of the machine, the transporter structure is driven from control station 27 so that the blades 14 of the machine straddle one row and so that blades 16 straddle another row of the crop plants to be harvested. The machine is driven along those rows and as it proceeds the harvesting mechanisms housed without the enclosing structures 10 and 12 are operated. They are operated by rotating their brushes and stripper bars in the directions previously described. The conveyor belts are rotated so that they move the harvested crop toward the rear of the harvesting structure. The brushes are rotatable at speeds which vary with type of crop. In this pepper picking embodiment they rotate at 600 revolutions per minute or more and the brushes are movable from a position toward and away from one another such that the bristles engage one another at one extreme of movement and are several inches apart at the other extreme of their movement. In one embodiment brush speed is constant at 600 revolutions per minute and the auger rotates at 150 revolutions per minute. The belt conveyors move at about 215 feet per minute. Adjustment to accommodate for light and heavy crop is made by varying the speed of the machine over the ground. The assembly is elevated relative to the wheels so that crop at the lowest point of its occurrence on the crop plant will be harvested. The harvesting structure is included at an angle such that the selected portion, or all, of the crop plant is subjected to brush action as the assembly is moved over the field. The brush spacing and speed are selected so that the crop, such for example as the chili pepper, are brushed from their vines and propelled by centrifugal force toward or over the stripper bars 33 and 35. That crop which is propelled over the stripper bar falls directly onto the conveyor belt to be transported away. Crops, pods or fruit that don't clear the stripper bar are helped across it by rotation of its auger. This function of the augers makes it possible to employ brushes that propel the fruit less violently. That is, use of the stripper bars makes it possible to use lower peripheral brush speeds. Lower peripheral brush speed can be accomplished either by rotating the brush at fewer revolutions per minute or by using a small diameter brush. Lower brush speed results in less tearing away of vine with the crop. Smaller diameter brushes makes it possible to harvest fruit closer to the ground and in more closely spaced rows.

The stripper bars perform another function. They serve to clean vines and leaves from the brushes and prevent their becoming fouled in which condition the brushes would be less effective in separating only the crop from the crop plant. The auger form is especially advantageous to the performance of this function. The auger tends to stretch out the plant vine so that it is not permitted to form into rolls or balls that might be forced in between the rows of bristles or the bristles of a row. The augers tend to work vine rearwardly to be forced out over the top rear of the harvesting structure or to transport it over into the conveyor. The blades 64 and 66 aid materially in pinching off sections of vine and in slicing it into smaller pieces so that the leaves and parts of vine that reach the conveyor are sufficiently small so that they will not interfere with conveyor operation. The stripper bars 64 and 66 are especially advantageous in the harvesting of chili peppers the vines and leaves of which are torn apart with relative ease.

Although I have shown and described certain specific embodiments of my invention, I am fully aware that many modifications thereof are possible. My invention therefore is not to be restricted except insofar as is necessitated by the prior art and by the spirit of the appended claims.

I claim:

1. In a crop harvester, in combination:
   a frame;
   a pair of roll brushes each formed about an elongate center axis and mounted on said frame with their axes substantially in parallel;
   a pair of stripper bars rotatably mounted on said frame one adjacent each of said brushes substantially parallel therewith and on the side of its respectively associated brush away from the other brush;
   means for rotating said brushes in opposite directions upwardly relative to crop plants between them and for rotating each of said stripper bars in the same direction as the brush to which it is adjacent is rotated; and
   means carried by said frame for conveying away crop brushed from the crop plants.

2. The invention defined in claim 1, in which said brushes comprise resilient bristles extending outwardly from their center axes, and in which each of said stripper bars is mounted above and sufficiently close to its respectively associated brush to be swept by its bristles.

3. The invention defined in claim 2, in which said bristles of the brushes are confined to rows of bristles spaced radially about their respective center structures.

4. The invention defined in claim 3, in which each stripper bar rotates in the same direction as its respectively associated brush; in which the stripper bars are disposed above the plane containing the center axes of said brushes; in which said brushes rotate in a direction such that the portions thereof between the two center axes rotate upwardly; and which further comprises a pair of shearing blades, each arranged adjacent to and parallel with a respectively associated one of said stripper bars.

5. The invention defined in claim 4, together with motive means for moving said frame to carry said brushes over a row crop such that they straddle the row and in which the projections of the stripper bars are arranged to form a spiral from their forward to their rearward end in a direction opposite the diection of rotation of the bars.

6. The invention defined in claim 5, in which said means for conveying away objects comprises a pair of conveyors carried by said frame and each disposed below a respectively associated one of said stripper bars and extending outwardly therefrom in a direction away from the brush associated with that stripper bar.

7. The invention defined in claim 6, in which said brushes and stripper bars are mounted on an incline extending upwardly from the forward end of the brushes where they first engaged the crop; and which comprises means for altering the spacing between the brushes.

8. The invention defined in claim 3, in which said means for conveying away objects stripped from the brushes comprises a pair of conveyor belts disposed one below each of said stripper bars and outwardly of the brushes.

9. The invention defined in claim 8, in which said brushes and said stripper bars extend together substantially in parallel and are mounted such that they are disposed at an incline to the field to be harvested.

10. The invention defined in claim 9, which further comprises means for lowering and raising the brushes and stripper bars in unison and for altering the degree of their inclination; and which further comprises means for altering the spacing between said brushes.

11. The invention defined in claim 1, in which said stripper bars are smaller in diameter than the brushes, have projections extending from their outer surfaces and which further comprise means for rotating said stripper bars such that the peripheral portions of the brushes sweep the projections of the stripper bars.

12. The invention defined in claim 11, in which the projections extending from the stripper bars are arranged to form a helix around the bar.

13. The invention defined in claim 11, in which said brushes comprise resilient bristles extending outwardly from their central axes and in which each of said stripper bars is mounted sufficiently close to its respectively associated brush to be brushed by its bristles and in which the bristles are confined to rows of bristles spaced radially about their respective center axes.,

References Cited

UNITED STATES PATENTS

| | | | |
|---|---|---|---|
| 2,460,029 | 1/1949 | Ramp | 56—19 |
| 2,491,777 | 12/1949 | Smith | 56—33 |
| 2,669,822 | 2/1954 | Kinne | 56—33 X |
| 2,677,227 | 5/1954 | Caldwell | 56—35 |
| 2,691,861 | 10/1954 | Lock et al. | 56—33 |
| 2,692,467 | 10/1954 | Bigler | 56—33 |
| 2,760,325 | 8/1956 | Witt | 56—33 X |
| 3,123,963 | 3/1964 | Horton et al. | 56—33 |
| 3,165,876 | 1/1965 | Towson | 56—130 |

RUSSELL R. KINSEY, Primary Examiner

U.S. Cl. X.R.

56—35